UNITED STATES PATENT OFFICE.

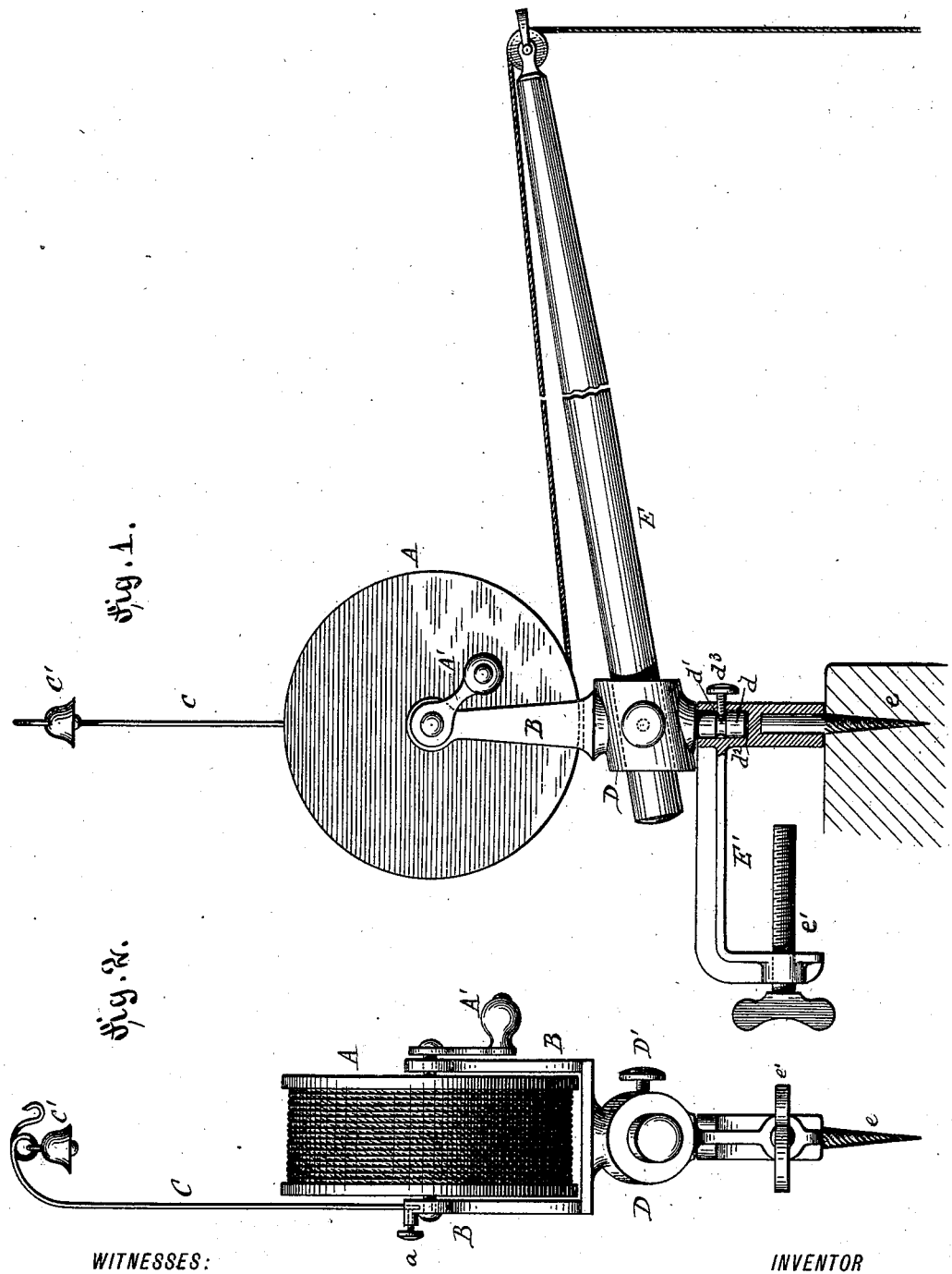

AUGUST GEILS, OF NEW YORK, N. Y.

FISHING-REEL.

SPECIFICATION forming part of Letters Patent No. 374,737, dated December 13, 1887.

Application filed September 23, 1887. Serial No. 250,492. (No model.)

*To all whom it may concern:*

Be it known that I, AUGUST GEILS, of the city of New York, in the county and State of New York, have invented certain new and useful Improvements in Fishing-Reels, of which the following is a specification.

This invention has reference to an improved fishing-reel which can be conveniently attached either to the gunwale of a boat or to a pier, or to any other point of support, so that several reels may be used for fishing at the same time, and any one of the reels be wound up in case of a bite.

The invention consists of a reel the supporting-frame of which is provided with a socket and clamp-screw below the frame for the fishing-rod, and with a clamping-frame and wood-screw for attaching the reel to the gunwale of a boat or to any other point of support. The reel-supporting frame is provided below the socket for the rod with a shank having an annular groove that is engaged by a socket and set-screw of the clamping-frame for permitting the fishing-rod to be set at any desired angle to the clamping-frame.

In the accompanying drawings, Figure 1 represents a side elevation of my improved fishing-reel, and Fig. 2 a rear elevation of the same.

Similar letters of reference indicate corresponding parts.

In the drawings, A represents a fishing-reel, which is made of wood or other suitable material, and on which the fishing-line is wound in the usual manner. The fishing-reel A is supported in a fork-shaped reel-frame, B, the shaft of the reel turning in bearings of said frame and being provided with a crank-handle, A', for turning the reel and winding the line on the same. A wire, C, from which a small bell, C', is suspended, is attached by a set-screw, $a$, to a socket of the supporting reel-frame B, the bell C' serving to give notice whenever a bite takes place, owing to the jerky motion imparted to the reel-frame B and wire C by the fishing line and rod. The reel-frame B is provided below the reel with a socket, D, which is arranged at right angles, or preferably somewhat inclined, to the vertical axis of the reel-frame B, and provided with a set-screw, D', for firmly clamping the fishing-rod E in position in the socket D.

Below the socket D is arranged a shank, $d$, which, with the socket, is preferably cast integral with the reel-frame B, said shank being provided with an annular groove, $d'$. The shank $d$ is inserted into a socket, $d^2$, of a U-shaped clamping-frame, E', and retained in the same by a set-screw, $d^3$, which engages the groove $d'$ of the shank $d$. This connection of the reel-frame B with the clamping-frame E permits the setting of the fishing-rod and reel at any suitable angle to the clamping-frame, as required by the current or tide. The clamping-frame E is provided below the socket $d^2$ with a wood-screw, $e$, around which the metal of the frame is cast, and with a clamping-screw, $e'$, at the opposite end, so that it can either be screwed into the wood-work of a pier or other suitable point of support or clamped rigidly to the gunwale of a boat. By attaching the fishing-reel, either by the clamping-screw $e'$ or wood-screw $e$, to a suitable support and throwing the line into the water the reel can be left to itself without holding it. As soon as a bite takes place, a jerk is imparted to the line, rod, and fishing-reel by the fish, which causes the ringing of the bell and gives a signal that the line has to be wound upon the reel. Several fishing reels and rods may thus be arranged and attended to by one person, as the socket and clamping-frame of the reel permit the convenient fastening of the reel and rod to a suitable support without requiring the holding of the rod in the hand.

My improved reel may be made on a larger scale for use by fishermen and sportsmen, and on a smaller and cheaper scale for the use of boys.

Having thus described my invention, I claim as new and desire to secure by Letters Patent—

1. The combination of a fishing-reel, a reel-supporting frame, a socket and clamping-screw below the reel-frame for supporting the fishing-rod, and a clamping-frame below said socket for attaching the reel to any suitable point of support, substantially as set forth.

2. The combination of a fishing-reel, a reel-supporting frame, a socket and clamping-screw below the reel-frame for supporting the fishing-rod, a shank below the socket, and a clamping-frame provided with a socket and set-screw for engaging said shank, substantially as set forth.

3. The combination of a fishing-reel, a reel-supporting frame, a socket and clamping-screw below the reel for the rod, a shank below the socket, said shank and socket being made integral with the reel-frame, and a clamping-frame provided with a socket and set-screw for said shank, a wood-screw, and a clamping-screw, substantially as set forth.

In testimony that I claim the foregoing as my invention I have signed my name in presence of two subscribing witnesses.

AUGUST GEILS.

Witnesses:
CARL KARP.
SIDNEY MANN.